United States Patent [19]

Martinez

[11] Patent Number: 4,651,156
[45] Date of Patent: Mar. 17, 1987

[54] INTEGRATED RADIO LOCATION AND COMMUNICATION SYSTEM

[75] Inventor: Louis Martinez, Carson, Calif.

[73] Assignee: McGraw-Edison Co., Rolling Meadows, Ill.

[21] Appl. No.: 706,963

[22] Filed: Feb. 28, 1985

Related U.S. Application Data

[63] Continuation of Ser. No. 346,862, Feb. 8, 1982, abandoned.

[51] Int. Cl.$^4$ ............................................. G01S 3/02
[52] U.S. Cl. .................................... 342/457; 342/463
[58] Field of Search ........................................ 343/457

[56] References Cited

U.S. PATENT DOCUMENTS

| | | | |
|---|---|---|---|
| 3,680,121 | 7/1972 | Anderson et al. | 343/457 |
| 3,714,650 | 1/1973 | Fuller et al. | 343/15 X |
| 3,747,106 | 7/1973 | Dalabakis et al. | 343/458 |
| 3,848,254 | 11/1974 | Drebinger et al. | 343/457 |
| 3,864,681 | 2/1975 | Olive | 343/457 |
| 3,886,554 | 5/1975 | Braun et al. | 343/457 |
| 3,889,264 | 6/1975 | Fletcher | 343/394 |
| 3,922,677 | 11/1975 | Tomkewitsch et al. | 343/457 |
| 4,054,880 | 10/1977 | Dalabakis et al. | 343/464 |

Primary Examiner—Theodore M. Blum
Assistant Examiner—John B. Sotomayor
Attorney, Agent, or Firm—Blakely, Sokoloff, Taylor & Zafman

[57] ABSTRACT

An integrated radio location and communication system comprising a plurality of radio locator-transmitter devices which may be fixed to vehicles and/or carried by persons and which are capable of transmitting the position and identity of said devices to two or more centrally located fixed receiver sites. Each of said locator-transmitters is continuously phase-locked to the RF carrier of a nearby commercial broadcast station, which station is modified slightly to provide periodic transmission of a "range-tone" which is on the order of a few kilohertz in frequency and is phase-locked to the RF carrier. An identical phase-locked range-tone is likewise generated within each locator-transmitter. The two centrally located fixed receivers are also phase-locked to the broadcast station RF carrier and likewise generate a range-tone. Thus the broadcast station, the plurality of locator-transmitters and the two fixed receiver sites all generate identical range-tones and these are continuously kept in synchronism with each other by virtue of a phase-lock loop arrangement wherein all range-tones are derived from (and locked to) the RF carrier of the AM broadcast station signal. The fixed receiver sites can compute the position of each locator-transmitter by comparing the phase of the range-tone sent to them directly by the locator-transmitter with the phase of the range-tone received directly from the broadcast station. A novel frame synchronization method is disclosed whereby the position (i.e., "time-slot") of each locator-transmitter emission and its RF subchannel uniquely identifies the emitting source and thus the location as well as identity of each of the many locator-transmitters.

24 Claims, 5 Drawing Figures

Fig. 4

INTEGRATED RADIO LOCATION AND COMMUNICATION SYSTEM

This is a continuation of application Ser. No. 346,862 filed Feb. 8, 1982, abandoned.

BACKGROUND OF THE INVENTION

1. Field of the Invention

This invention relates to radio location systems for determining the identity and location of a plurality of locator-transmitter devices at arbitrary fixed or moving locations throughout a geographical location. My invention finds application in public safety systems, commercial trucking and taxi dispatching operations, personal alarm systems, and the like. This invention is related in part to my invention entitled "Ultra-Narrow Band Communication System", U.S. Pat. No. 4,117,405.

2. Prior Art

Systems for locating vehicles and/or persons within a city or extended area, sometimes referred to as automatic vehicle monitoring (AVM) systems, have long held the interest of both public safety authorities and commercial enterprises for the control of vehicles, for dispatching operations, and for citizens' alarm devices. Indeed, many different types of systems have been proposed in the past and some are currently undergoing testing. These systems utilize such radio methods as LORAN, OMEGA, radio pulse tri-lateration, and similar wireless techniques. Another radio location method employs what are referred to as "sign-posts" which are in fact either miniature radio transmitters or receivers located at various street intersections and within city blocks. These latter devices are intended to communicate with passing vehicles and thereby determine their position subsequent to which this information is communicated to a central location within the city. The latter systems suffer the problem that a considerable number of such sign-posts are necessary for accurate coverage within a city; these numbers ranging upwards of 10,000 or more sign-posts, and these pose difficult maintenance and installation problems as well as very high cost. On the other hand the wireless or radio technique like LORAN are often inaccurate, have complex and costly communication devices and receivers are necessary on each vehicle. Furthermore, none of these prior art systems are readily adaptable to low cost miniature packaging such as might be necessary for on-person alarm application (herein referred to as citizens' alarm).

Another prior art radio location system which was designed by the present inventor utilizes three existing local radio broadcast stations phase-locked to each other; that is, one broadcast station serves as the "master" station and the other two derive their RF carrier by phase-locking to the master station and thus all three stations are "synchronized." A receiver within a vehicle is designed to tune to and "track" all three broadcast stations and make phase comparisons in a manner designed to disclose the position of the vehicle, relative to some starting reference location.

SUMMARY OF THE INVENTION

The invention which I herein disclose represents a significant improvement over my prior three broadcast station system because it utilizes only a single broadcast station and two fixed receivers and because the vehicle borne device (or the device carried on-person) is relatively small and simple. Each of said locator-transmitters is continuously phase-locked to the RF carrier of a nearby commercial broadcast station, which station is modified slightly to provide periodic transmission of a "range-tone" which is on the order of few kilohertz in frequency and is phase-locked to the RF carrier. An identical phase-locked range-tone is likewise generated within each locator-transmitter. The two centrally located fixed receivers are also phase-locked to the broadcast station RF carrier and likewise generate a range-tone. Thus the broadcast station, the plurality of locator-transmitters and the two fixed receiver sites all generate identical range-tones and these are continuously kept in synchronism with each other by virtue of a phase-lock loop arrangement wherein all range-tones are derived from (and locked to) the RF carrier of the AM broadcast station signal, which RF carrier is capable of being detected throughout the area of coverage of this system. Each locator-transmitter incorporates a RF frequency synthesizer arrangement whereby its transmitter frequency (e.g. at 35 MHz) is precisely generated and transmitted to the fixed receiver sites using very narrow-band techniques whenever the position of a locator-transmitter is to be determined. The fixed receiver sites can compute the position of each locator-transmitter by comparing the phase of the range-tone sent to them directly by the locator-transmitter with the phase of the range-tone received directly from the broadcast station. This phase difference is proportional to the difference in radio path length between signals received directly from the broadcast station relative to those received via the locator-transmitter. Such a range comparison is made simultaneously at both receiver fixed sites and based upon this information a computation ca be made to determine the location of said locator-transmitter using well known mathematical relations. My system is capable of continuously determining the location of hundreds or thousands of locator-transmitters and communicating automatically said position information to two or more fixed receiver sites. A novel frame synchronization method is disclosed whereby the position (i.e., "time-slot") of each locator-transmitter emission uniquely identifies the emitting source and thus the location as well as identity of each of the many locator-transmitters can be automatically and continuously ascertained.

In addition, wherein my aforesaid prior three broadcast station system was capable of determining the position of a vehicle, no simple means were available for transmitting this information to a centrally located dispatching point. In my invention disclosed herein, this problem of communicating the position information to a central location is inherently and simply solved in a manner hereinafter described. Therefore my current invention simultaneously solves the location problem and the communications problem and I therefore refer to it as the "integrated radio location and communication" (IRLC) system.

The communication aspects of the system which I herein disclose is related intimately to the system disclosed in "Narrow Band Communication System", U.S. Pat. No. 4,117,405, issued Sept. 26, 1978. Stated simply, this latter communication system is a very narrow band system which has inherently high signal-to-noise ratio, natural immunity to both intentional and unintentional radio signal interference, and very high traffic capacity. The reader is referred to this latter patent application for further detail.

DESCRIPTION OF THE PREFERRED EMBODIMENT

Figure 1:
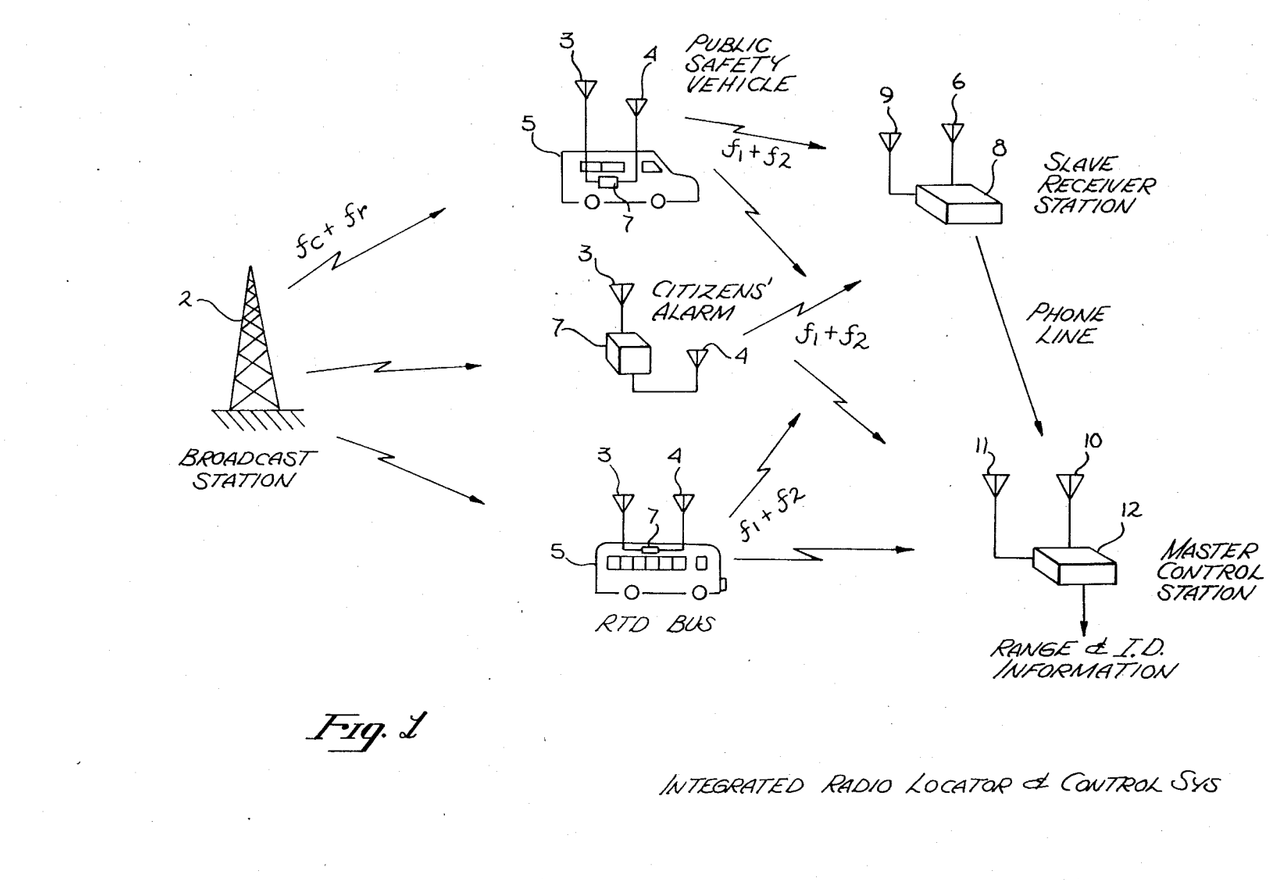
FIG. 1 illustrates symbolically my integrated radio location and communication system including a broadcast station, plurality of locator-transmitters, and two centrally located fixed receiver sites.

FIG. 1 illustrates a preferred embodiment showing the overall arrangement of the integrated radio location and communication system wherein broadcast station 2, designed to transmit conventional broadcast material, is modified to transmit a "range-tone" $f_r$, for example at 3 KHz, periodically for my system, which tone $f_r$ in no way interferes with the normal operation of said broadcast station. Receiving antenna 3 detects these broadcast signals and sends them to typical locator-transmitters 7, which transmitters may be located on vehicles 5 or hand carried. Transmitters 7 are phase-locked to the RF carrier of station 2 and generate therefrom a 3 KHz range-tone $f_r$ (for example by frequency divider means), which range-tone circuit is further designed in a manner to be synchronized to the occasional periodic transmission of range-tone $f_r$ from broadcast station 2. For example, broadcast station 2 may transmit a range-tone burst once every 30 minutes for a period of perhaps five seconds so as to enable range-tone synchronization of transmitters 7 and receivers 8 and 12, these range-tones being synthesized from the broadcast station RF carrier by frequency divider means, thus phase-locked to that RF carrier.

Transmitter 7 includes a receiver which is phase-locked to the carrier of broadcast station 2 and a range-tone generating circuit adapted to frequency divide down the broadcast station signal frequency $f_c$ to 3 KHz, thus to enable this latter range-tone to be synchronized to the range-tone burst which is periodically transmitted from broadcast station 2. Therefore transmitters 7, being always phase-locked to the carrier broadcast signal $f_c$ of station 2, continuously generates a range-tone of 3 KHz which is in synchronism with the range-tone generated by station 2, however, it is displaced in phase from the latter range-tone by an amount proportional to the propagation time of the signal from broadcast station 2 to transmitters 7. This phase lag, being on the order of 100 microseconds when broadcast station 2 is approximately 20 miles away from transmitters 7, provides the necessary information for computing range, thus location.

Transmitters 7 also contrain a frequency synthesizer which is phase-locked to broadcast carrier $f_c$ of station 2 and which generates therefrom two transmitter RF carrier frequencies, for instance at a frequency of 35 MHz, and the "Beat" between these two 35 MHz frequencies is equal to and in phase with the range-tone $f_r$ generated by transmitters 7. Transmitters 7 will then transmit via antenna 4 a range-tone $f_r$ (i.e., location information) to centrally located receivers 8 and 12 on occurance of a specified condition, for example every 20 seconds based on clock trigger pulses.

The centrally located receivers 8 and 12 are designed to detect radio signals directly from broadcast station 2 using antennas 9 and 11, and also detect the signals radiated from transmitter 7 via antennas 6 and 10. These centrally located receivers 8 and 12 each develop a first range-tone based on the signal received directly from broadcast station 2 and a second range-tone based on the signals received from transmitters 7; these two range-tones are phase compared and the location of transmitters 7 is therefrom computed based on well known mathematical relationships based on the findings of receiver 8 in conjunction with findings of receiver 12.

Figure 2:
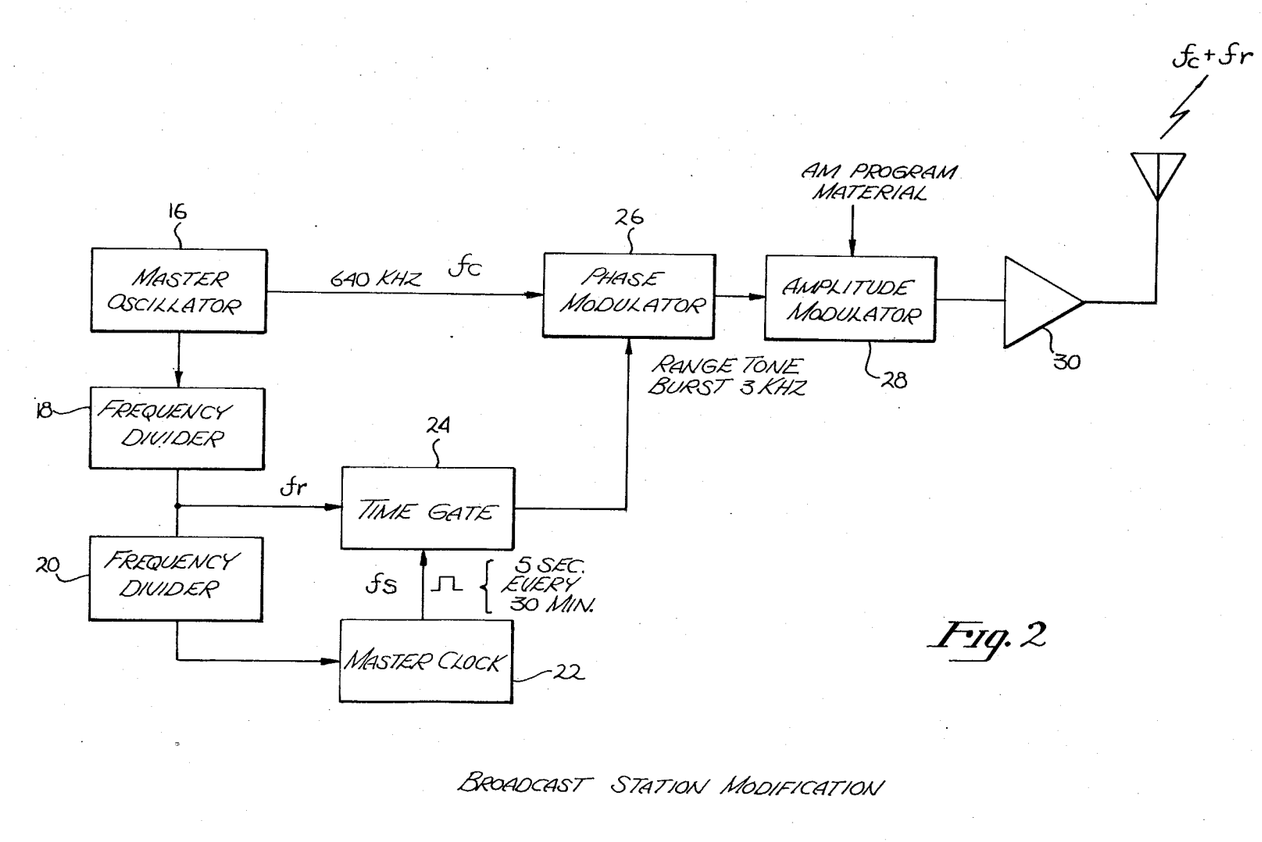
FIG. 2 illustrates the broadcast station modifications which are necessary to make the broadcast station compatible with my system.

FIG. 2 shows the modifications which are necessary to a typical AM broadcast station to operate in conjunction with my system. A master oscillator 16, typically used in all broadcast stations and which is usually an accurate crystal controlled oscillator, generates the basic radio frequency of the broadcast station at, in this example, 640 KHz. Frequency divider 18 is locked to this master oscillator and develops in this example a tone $f_r$, the latter frequency being the 3 KHz range-tone mentioned before. Frequency divider 20 further divides the output of frequency divider 18 and generates a low clock frequency of, for example, one impulse every 30 minutes. This is sent to master clock 22 which develops a gating signal to permit range-tone $f_r$ to be periodically gated through time gate 24 to phase modulator 26. For example, the 3 KHz range-tone could be gated on for five seconds every 30 minutes. This range-tone "burst" phase modulates the broadcast carrier $f_c$ in a manner designed to minimize deleterious effects on the AM broadcast station conventional signal so that it may perform its normal function of transmitting AM program material without annoying its listeners. This could be typical "time track". For example, phase modulator 26 could be designed to provide a +30° phase angle modulation in correspondence with the range-tone frequency $f_r$ and this would not be detectable by conventional AM receivers. Such a modulation process would give rise to only two significant side bands and all harmonic side bands would be negligible, as is well known in the phase modulation theory relating to "small angle" modulation. Thus the broadcast station 2 can be modified in a manner which in no way interferes with its normal operation yet is capable of transmittin9 a range-tone simultaneously to many locator-transmitters 7 for synchronization purposes.

Figure 3:
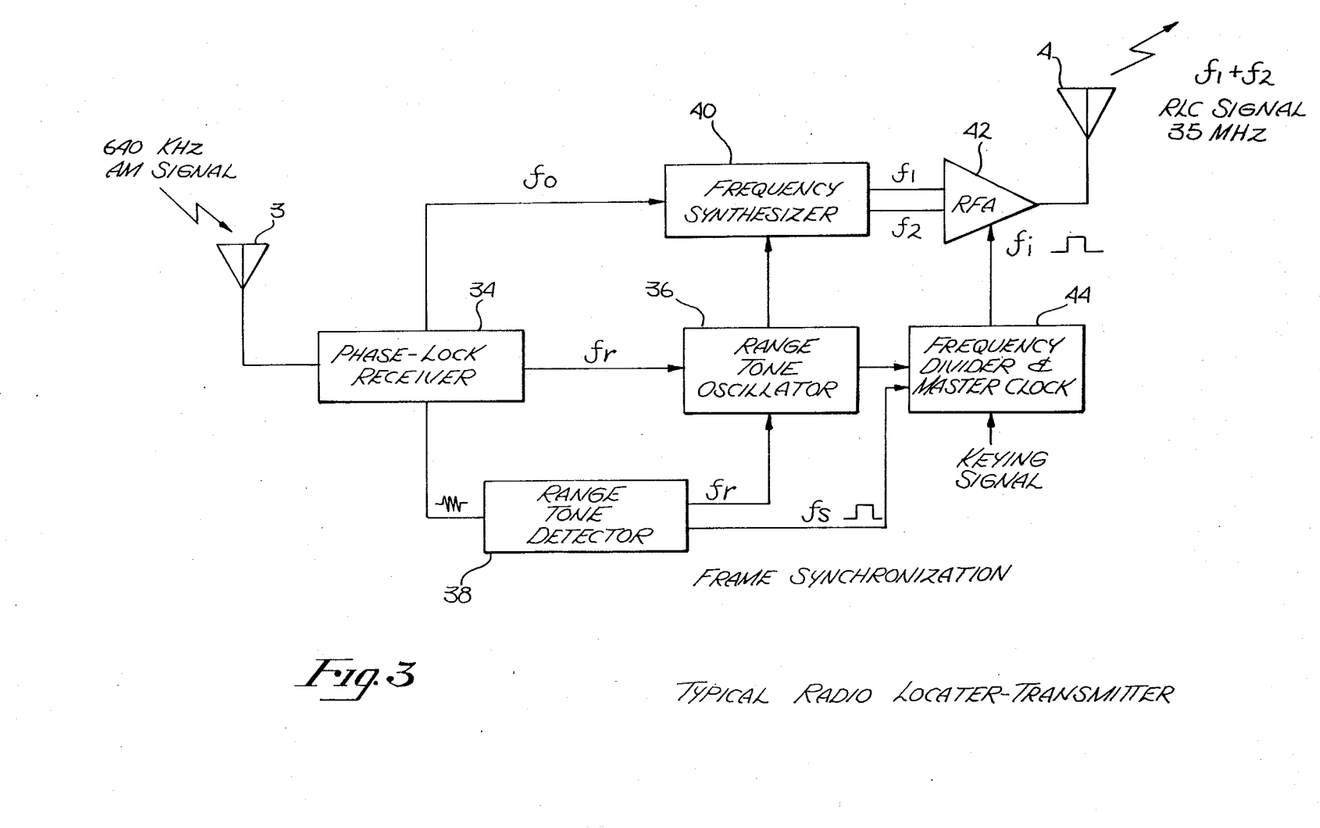
FIG. 3 shows schematic arrangement of a typical radio location and communication transmitter (herein called the "locator-transmitter").

FIG. 3 shows an arrangement of a typical radio locator-transmitter 7. The signal broadcast by station 2 is detected by antenna 3 and sent to phase-lock receiver 34. Receiver 34 employs a phase-lock loop arrangement wherein a local reference oscillator is synchronized with the incoming broadcast station RF carrier and wherein the amplitude modulated audio signals are stripped away from the broadcast signal. Such a receiver is described in detail in U.S. Pat. No. 4,117,405.

Briefly then, phase-lock receiver 34 is continuously and tightly locked to the RF carrier $f_c$ from station 2 and derives therefrom a reference frequency $f_o$ which is sent to frequency synthesizer 40, and a range-tone $f_r$ derived from the phase modulation which is periodically put on broadcast station signal $f_o$ by range-tone circuits which I have described in relation to FIG. 2. Range-tone detector 38 detects the presenc of the range-tone from station 2, which range-tone is only momentarily transmitted by station 2, for example, for five seconds every 30 minutes (this periodic rate is called $f_s$ in FIG. 2 herein) and this is used to synchronize range-tone oscillator 36 and also to provide "frame synchronization". Oscillator 36 is on continuously and phase-locked to the reference oscillator which is part of a phase-lock receiver 34. It is expected that once locked in, range-tone oscillator 36 will maintain its phase relationship to the range-tone oscillator contained within broadcast station 2, however, should oscillator 36 become unsynchronized for some unexpected reason, it will come back into synchronization by virtue of the operation of range-tone detector 38, at the next occurance of a range-tone burst transmission from broadcast station 2. Thus, in this example, range-tone oscillator 36 will never be out of synchronization with the corresponding range-tone oscillator in station 2 for a length of time in excess of 30 minutes because station 2 transmits such a range-tone at least once every 30 minutes, or more frequently if desired.

Frequency synthesizer 40 accepts the reference frequency $f_o$ from receiver 34 and the range-tone from oscillator 36 and synthesizes therefrom two RF frequencies $f_1$ and $f_2$ whose frequency difference is equal to the frequency of range-tone oscillator 36 and in such a manner so that the effective "beat frequency" signal between $f_1$ and $f_2$ is accurately in phase with the signal from range-tone oscillator 36; for example, a well known single side band modulation process could be used. RF Amplifier 42, when keyed ON from master clock 44, transmits signals $f_1$ and $f_2$ to the centrally located receivers 8 and 12 via antenna 4.

The crucial functions of transmitters 7 are thus the accurate phase-lock to broadcast station signal $f_c$ and generation therefrom of a range-tone and RF transmitter frequencies $f_1$ and $f_2$ in such a manner wherein the beat signal between these two frequencies $f_1$ and $f_2$ comprises the range-tone frequency $f_r$ and consequently effectively relaying range information to central receivers 8 and 12 so they can determine the position and identity of transmitters 7.

The identity of any one of a plurality of transmitters 7 is determined by virtue of a time and frequency division coding which will now be described. Whenever broadcast station 2 transmits a range-tone burst, in this example a five seconds burst every 30 minutes (i.e., at a rate of $f_s$), range-tone detector 38 transmits a frame synchronization pulse to frequency divider and master clock 44, which clock 44 also continuously receives the synchronized range-tone signal $f_r$ from oscillator 36, which uses these two inputs to accurately synthesize a transmitter gating pulse $f_t$ at an accurately prescribed time relative to the frame synchronization burst which is transmitted from the broadcast station 2, and this "time-slot", together with the assigned RF transmitter frequency comprise a multiplex concept wherein the specific RF frequencies $f_1$ and $f_2$ and the "time-slot" of transmission uniquely identifies any particular transmitter 7 and furthermore, the location of transmitter 7 within a city is determined on the basis of the range-tone phase information communicated from transmitter 7, which information is conveyed in the beat frequency between signals $f_1$ and $f_2$.

The range-tone periodically transmitted from station 2 at rate $f_s$ thus serves to not only provide phase synchronization for determining the location of transmitters, but also serves to synchronize the time at which transmitters 7 are to report their position. The actual rate at which transmitter 7 reports its position and identification is shown in FIG. 3 as $f_1$ which, for example, might be every 20 seconds, within a unique "time-slot." For example, if we define 64 unique frequency pairs $f_1$ and $f_2$ for "frequency-division" identification purposes, and 128 "time-slots", then 8,192 different transmitters 7 (e.g. 8,192 vehicles) could be separately "tracked" and identified, each reporting (for example) for 0.156 seconds every 20 seconds.

Figure 4:
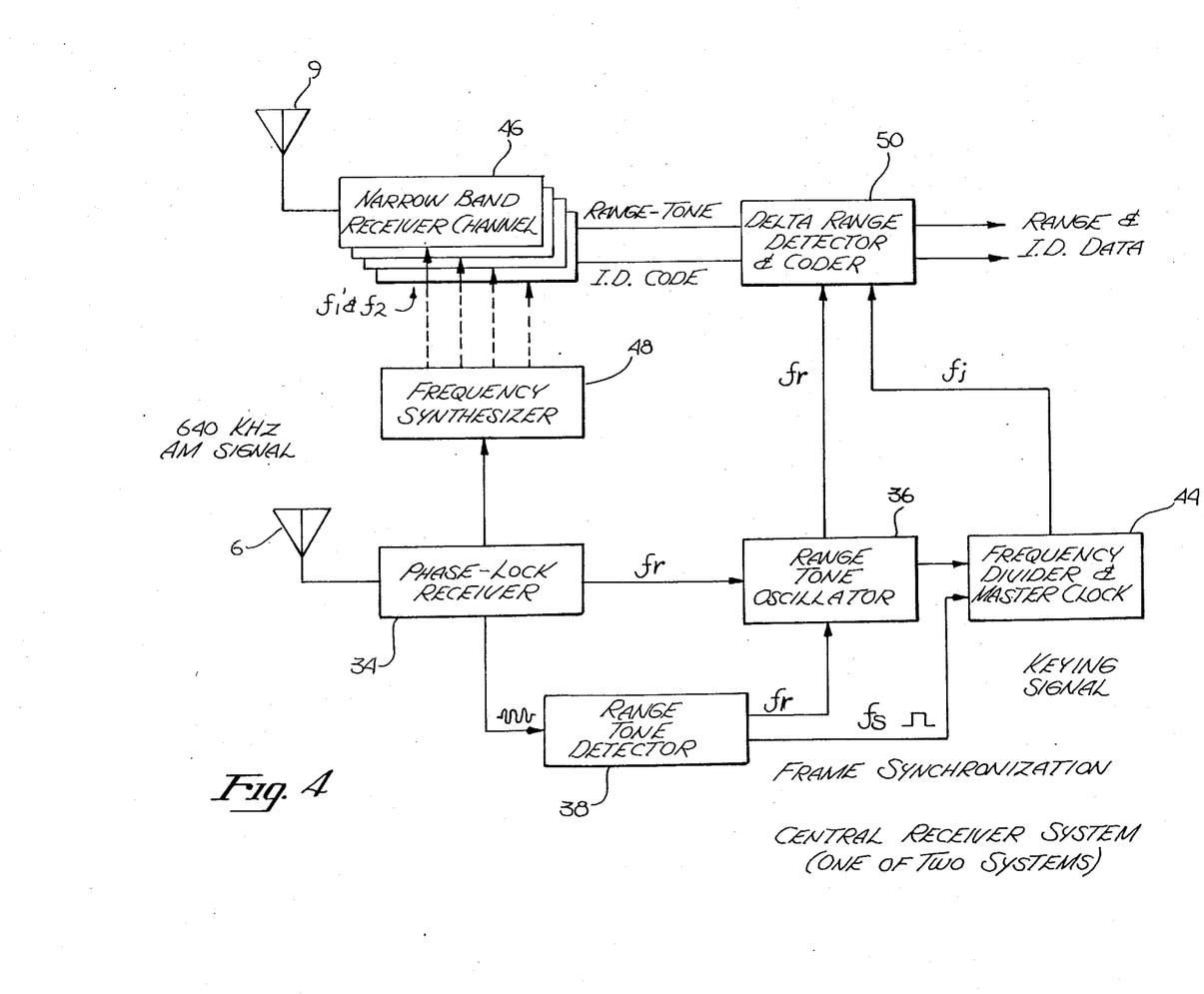
FIG. 4 shows a schematic arrangement of a centrally located fixed receiver site.

FIG. 4 shows a schematic arrangement of a receiver at central locations. At least two of these receivers are necessary to make a location determination and these receivers should be placed, for example, at opposite sides of a city and opposite the broadcast station so that location errors can be minimized. For example, the two central receivers and broadcast station might be located on the three points of an equilateral triangle.

Referring to FIG. 4, antenna 6 detects the RF signal from broadcast station 2 and sends it to phase-lock receiver 34. Range-tone detector 38, range-tone oscillator 36, and frequency divider and master clock 44 function in a manner equivalent to a typical radio locator-transmitter shown in FIG. 3, hereinbefore described. Thus the circuits shown in the lower half of FIG. 4 are essentially equivalent to those shown in FIG. 3 whose purpose is to phase-lock a receiver to the broadcast station signal $f_c$ and to derive therefrom a range-tone $f_r$ and a frame synchronizing signal $f_s$ which will enable the remaining circuits of the central receiver to determine the identity and location of each of the plurality of transmitters 7.

Phase-lock receiver 34 generates a reference frequency $f_o$ which it sends to frequency synthesizer 48 which in turn synthesizes a plurality of frequency pairs $f_1$ and $f_2$ identical to those which are sent from each of the plurality of locator-transmitters. Each pair of signals $f_1$ and $f_2$ define a frequency channel, which channel comprises a part of the identification of the emitting locator-transmitter 7.

Narrow band receiver channel 46 is one of a plurality of such channels corresponding to the many different frequency pairs $f_1$ and $f_2$ employed in a particular system. These RF channels 46 function in a manner which will now be described. Signals transmitted by locator-transmitters 7 are detected by antenna 9 (e.g., 35 MHz) and these signals are sent to all the parallel channels in narrow band receiver 46. Narrow band receiver 46 contains (see FIG. 5), within each channel, RF preamplifiers 52 and 60 followed by a pair of phase-lock receiver circuits wherein oscillators 58 and 68 within each phase-lock loop are brought into "soft" synchronism with anticipated incoming signals $f_1$ and $f_2$ through use of "priming" signals $f'_1$ and $f'_2$ from frequency synthesizer 48. In other words, each channel of receiver 46 is effectively a phase-lock loop arrangement wherein the "free-running" frequency of oscillators 58 and 68 are kept accurately in tune, on the average, by signals derived from frequency synthesizer 48. However, when the incoming signals $f_1$ and $f_2$ from a transmitter 7 arrive at the input to the phase-lock loop receiver, the oscillators 58 and 68 of the phase-lock loops are captured by the incoming signal and brought into "hard" synchronism with the incoming signals $f_1$ and $f_2$. By this process the two independent oscillators of each of the two phase-lock loops within each receiver channel is brought into synchronism with the two incoming signals $f_1$ and $f_2$ from each locator-transmitter 7.

Figure 5:
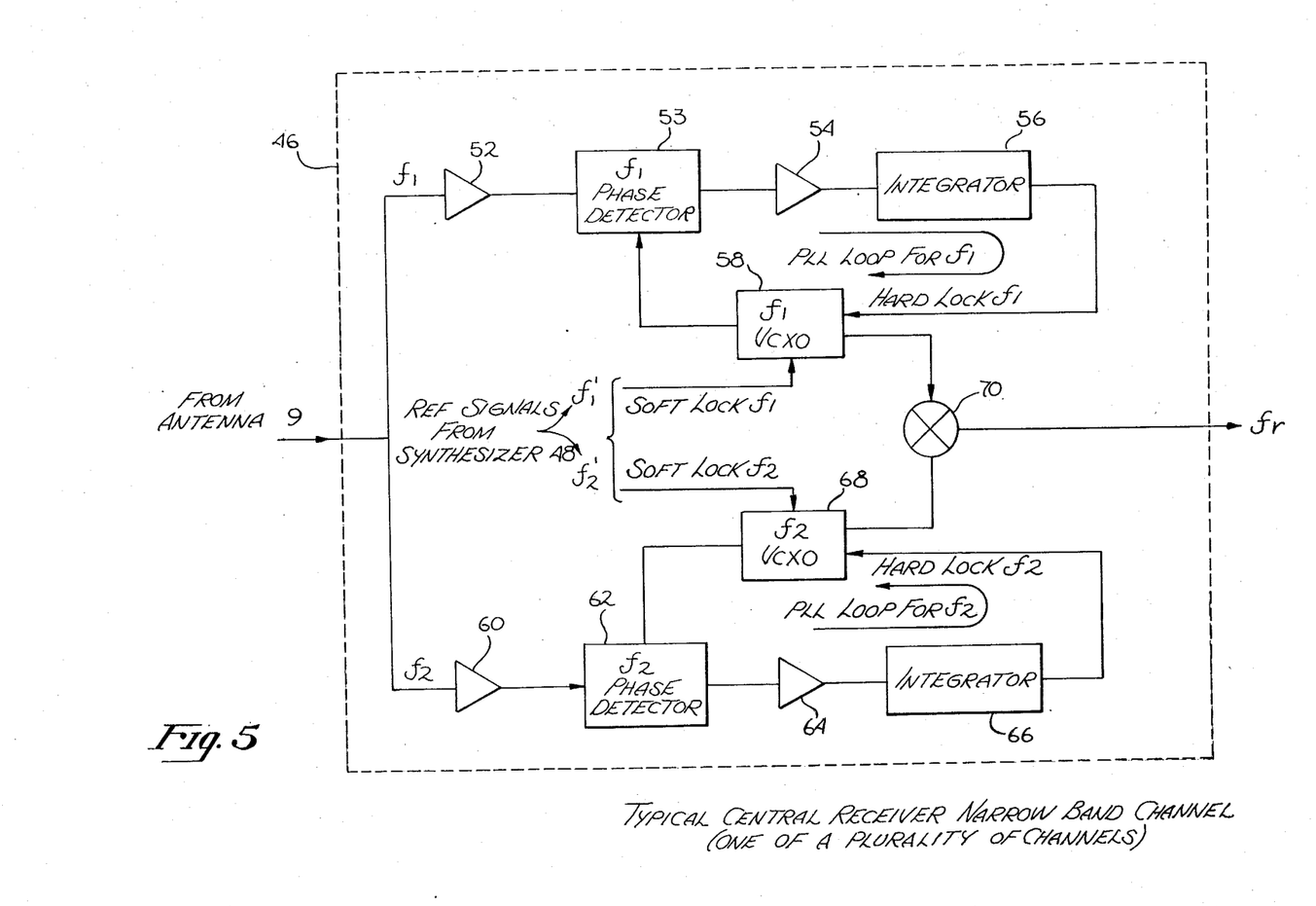
FIG. 5 shows a schematic arrangement of a centrally located narrow band channel receiver.

When the two oscillators 58 and 68 of the phase-lock loops within each receiver channel are brought into "hard" synchronism with the incoming signal, then the beat signal developed when output of oscillators 58 and 68 are mixed in mixer 70 comprises the range-tone signal which we desire. There are many parallel channels such as shown in FIG. 5 in a central receiver system and each of these channels corresponds with a pair of frequencies $f_1$ and $f_2$ used in the many locator-transmitters of any one system.

Referring again to FIG. 4, the range-tone $f_r$ from receiver 46 together with timing information $f_i$ and the second referenced ranging tone developed in range-tone oscillator 36 are taken as input signals to delta range detector and coder 50 which derives therefrom identification information and differential range information for each particular locator-transmitter 7 that may be currently transmitting a signal, and sends this information in digital form to its companion central receiver which in turn computes the location of said locator-transmitter 7 and identifies it. Delta range detector and coder 50 circuits are relatively straight forward; i.e., conventional well known digital techniques provide means which can readily compare the phase of range-tones from oscillator 36 with the phase of range-tone from receiver 46 and derive therefrom a digital code proportional to the phase difference between these two range-tones. This is the information necessary for location computation. In addition, they can derive a binary digital code that identifies the particular locator-transmitter presently emitting based on its time position relative to the subframe synchronization signal $f_i$.

It will be obvious to those skilled in the art of radio and digital techniques that many variations of my basic approach are possible and that these recitals are primarily an illustrative example of my basic invention. Those skilled in the art will also recognize the numerous additional applications which this system can be put to, for example, in aircraft collision avoidance systems, in the control of ships within a harbor, in mass fire fighting efforts wherein the position of individual pieces of fire fighting equipment and fire fighting personnel can be determined from a central location for fire control purposes, and the like.

It is also obvious that a specially contructed RF transmitter could be employed in place of broadcast station 2 for certain specialized applications such as fire fighting or some military applications.

I also anticipate the use of doppler frequency shift information from RF carriers $f_1$ and $f_2$ as detected in the central receiver stations to compute velocity and direction information on each of the locator-transmitters 7 to thereby further refine and update location information.

I claim:

1. A radio location and communication system of the phase ranging type comprising:
    a stationary broadcast means for transmitting a continuous RF carrier signal, said stationary broadcast means including means for generating a carrier range tone signal synchronized with said continuous RF carrier signal and for transmitting, on said continuous RF carrier signal, a periodic carrier rang tone signal comprising a carrier range tone signal burst,
    one or more mobile locator transmission means phase-locked to the RF carrier signal from said broadcast means for continuously generating a transmitter range tone signal periodically synchronized by said periodic carrier range tone signal burst from said stationary braodcast means, and for transmitting said transmitter range tone signal at specific times between the periodic carrier range tone signal bursts, and
    a plurality of stationary receiving means, each for detecting the carrier range tone signal burst from said stationary broadcast means and generating a continuous receiving means range tone signal synchronized by said periodic carrier range tone signal burst from said stationary broadcast means and for detecting said transmitter range tone signal from said locator transmission means and phase comparing said receiving means range tone signal and said transmitter range tone signals from the mobile unit for the computation of the location of said locator transmission means, whereby the mobile locator transmission means and the plurality of stationary receiving means are periodically resynced by the stationary broadcast means, and may be used a plurality of times thereafter to determine the location of the mobile locator transmission means prior to the next resyncing thereof.

2. A location and communication system of claim 1 wherein each of said mobile locator transmission means relays said transmitter range tone signals at periodic time intervals between the periodic carrier range tone signals, and said plurality of said receiving means detect the time interval between each transmitter range tone signal and each carrier range tone signal to compute the identification of said locator transmission means.

3. A location and communication system of claim 1, wherein said stationary broadcast means comprises;
    oscillation means for generating RF carrier signals,
    carrier range tone generating means coupled to the oscillation means for providing the carrier range tone, and
    means coupled to said oscillation means and said carrier range tone generating means for phase modulating the RF carrier signal and the carrier range tone, and amplitude modulation means for amplitude modulating ordinary program material by the phase modulated RF carrier signal and for transmitting the result.

4. The location and communication system of claim 1, wherein said mobile locator transmission means comprises:
    receiving means phase-locked to said RF carrier signal,
    transmitter range tone generating means coupled to said receiver synchronized to the periodic carrier range tone, for generating a transmitter range tone displaced in phase from the carrier range tone by an amount proportional to the propagation time of the RF carrier signal from said broadcast means to said locator transmission means,
    generation means coupled to said receiving means and said range tone generating means for generating and transmitting a pair of RF transmitter frequencies and for transmitting said transmitter range tone.

5. The radio location and communication system of claim 4, wherein each of said stationary receiving means comprises:
    phase-lock receiving means phase-locked to said RF carrier signal to derive therefrom said periodic carrier range tone and a first reference frequency signal, frequency synthesizing means coupled to said receiver for synthesizing said first reference signal to produce second reference signals corresponding with pairs of RF signals from locator transmission means, narrow band receiving means coupled to said frequency synthesizing means having a pair of parallel channels for synchronizing said second reference signals from said frequency synthesizing means with corresponding incoming pairs of RF signals received from said locator transmission means to produce a first range tone and an ID code, and range detecting and decoding means coupled to said narrow band receiver and to said phase-lock receiver for receiving said first range tone and ID code and said periodic carrier range tone, to derive ID and differential range information for each locator transmission means and transmitting said information to another of said receiving means.

6. The radio and communication system of claim 5 wherein each parallel channel of said narrow band receiver further comprises:

preamplifing means for receiving respective pairs of RF transmitter signals from said locator transmitter means, a pair of phase-lock receivers circuits coupled to said preamplifing means each having an oscillator synchronized with each of said pair of RF transmitter signals by using said second reference signals from said frequency synthesizing means, and a mixing means for mixing said synchronized signals from each of said oscillators to produce said first range tone and said ID code corresponding to said locator transmitter means.

7. The radio and communication system of claim 5 wherein said narrow band receivers comprises a plurality of pairs of parallel channels.

8. A radio location and communication system of the phase ranging type, comprising:

stationary broadcast means for transmitting a continuous RF carrier signal from a predetermined location, said stationary broadcast means including means for generating a carrier range tone signal synchronized with said continuous RF carrier signal and for transmitting, on said continuous RF carrier signal, a periodic range tone signal comprising a carrier range tone signal burst, one or more mobile locator transmission means phase-locked to said RF carrier signal from said broadcast means for continuously generating a transmitter range tone signal, for generating between said periodic carrier range tone signals a pair of RF transmitter frequencies wherein the differnce of said pair of frequencies equals the periodic carrier range tone frequency, and for relaying said pair of RF transmitter frequencies, and a plurality of stationary receiving means for detecting the carrier range tone signal from said broadcast means and said pair of frequencies from said locator transmission means and phase comparing said transmitter range tone signal and the difference of said pair of RF transmitter frequencies to compute the location of said locator transmission means, whereby the mobile locator transmission means and the plurality of stationary receiving means are periodically resynced by the stationary broadcast means, and may be used a plurality of times thereafter to determine the location of the mobile locator transmission means prior to the next resyncing thereof.

9. A location and communication system of claim 8 wherein each of said pair of frequencies generate doppler frequency shift information which is received by said receiving means whereby said receiving means may compute velocity and directional information of each of said locator transmission means.

10. A location and communication system of claim 8, wherein said stationary broadcast means comprises:

oscillation means for generating RF carrier signals, frequency divider means coupled to the oscillation means for providing the carrier range tone and, a phase modulator coupled to said oscillation means and said frequency divider means for phase modulating and transmitting the RF carrier signal and the carrier range tone.

11. The locator and communication systems of claim 8 wherein said mobile locator transmission means comprises:

a receiver phase-locked to said RF carrier signal, a transmitter range tone generating circuit coupled to said receiver synchronized to the periodic range tone, a frequency synthesizer phase-locked to the RF carrier signal for generating therefrom a pair of transmitter RF carrier frequencies at a beat equal to and in phase with said periodic range tone, and generation means coupled to said synthesizer for transmitting said transmitter range tone.

12. The location and communication system of claim 8 wherein said mobile locator transmission means comprises:

detector for receiving said RF carrier signal, phase-lock receiver coupled to said detector and locked to the RF carrier signal for deriving a reference frequency and a carrier range tone, said receiver having a reference oscillator, range tone detector means coupled to said phase-lock receiver, range tone oscillator means coupled to the range tone detector, phase-locked to said reference oscillator for providing a synchronous transmitter range tone, and a frequency synthesizing means coupled to receive said reference frequency from said phase-lock receiver and the synchronous transmitter range tone from the range tone oscillator to provide a pair of RF transmitter frequencies whose frequency difference is equal to the frequency of the carrier range tone.

13. The radio location and communication system of claim 8, wherein each of said stationary receiving means comprises:

a phase-lock receiver phase-locked to said broadcast carrier signal to derive therefrom said periodic carrier range tone and a first reference frequency signal, frequency synthesizer coupled to said phase-lock receiver for synthesizing said first reference signal to produce one or more second reference signals, each second signal corresponding with pairs of RF signals from one or more of said locator transmission means, narrow band receiver coupled to said frequency synthesizer having parallel channels for synchronizing said second reference signals from said frequency synthesizer with incoming pairs of RF signals to produce a second range tone and an ID code, and a delta range detector and decoder coupled to receiver said narrow band receiver and said phase-lock receiver for said second range tone and ID code, timing signals, and said periodic carrier range tone, to derive ID and differential range information for each of said locator transmission means and transmitting said information to another of said receiving means.

14. The radio and communication system of claim 13, wherein each parallel channel of said narrow band receiver further comprises:

preamplifing means for receiving respective pair of RF transmitter signals from said locator transmitter means, a pair of phase-lock receivers circuits coupled to said preamplifing means each having an oscillator synchronized with each of said pair of RF transmitter signals by using said second reference signals from said frequency synthesizing means, and a mixing means for mixing said synchronized signals from each of said oscillators to produce said first range tone and said ID code corresponding to said locator transmitter means.

15. A radio location and communication system, of the phase ranging type, comprising:

stationary conventional AM boradcast means for transmitting ordinary program material on a continuous RF carrier signal from a predetermined loation, said stationary broadcast means including means for generating a carrier range tone signal phase-locked to said continuous RF carrier signal and for transmitting, on said continuous RF carrier signal, a periodic carrier range tone signal comprising a carrier range tone signal burst, mobile locator transmission means phase-locked to receive the broadcast signal from said predetermined location, for generating a continuous transmitter range tone frequency identical to said carrier range tone frequency as received, and a pair of RF transmitter frequencies in such a manner wherein the frequency difference between said pair of RF transmitter frequencies equals the periodic carrier range tone frequency, and for relaying said transmitter range tone frequency and said pair of RF transmitter frequencies, and a plurality of stationary receiving means for detecting said periodic carrier range tone signal from said broadcast means at said predetermined location and said pair of RF transmitter frequecies from said locator transmission means, for generating a continuous receiving means range tone signal synchronized by said periodic range tone signal from said stationary broadcast means, and phase comparing said signals to compute the location of said locator transmission means, whereby the mobile locator transmission means and the plurality of stationary receiving means are periodically resynced by bhe stationary broadcast means, and may be used a plurality of times thereafter to determine the location of the mobile locator transmission means prior to the next resyncing thereof.

16. The location and communication system of claim 15, wherein said mobile broadcast means comprises:

oscillation means for generating basic radio carrier frequencies, a first frequency divider coupled to the master oscillator for providing a carrier range tone, a second frequency divider coupled to the first frequency divider to generate a low clock frequency, a master clock coupled to the second frequency divider for generating gating signals, a time gate coupled to said master clock, a phase modulator coupled to said oscillator means and said time gate for phase modulating the radio carrier frequencies and the periodic carrier range tone.

17. The location and communication system of claim 15 wherein said mobile locator transmission means comprises:

detector for receiving said RF carrier signal, phase-lock receiver coupled to said detector and locked to the RF carrier signal for deriving a reference frequency and a carrier range tone, said receiver having a reference oscillator, range tone detector means coupled to said phase-lock receiver, range tone oscillator means coupled to the range tone detector, phase-locked to said reference oscillator for providing a synchronous transmitter range tone, and a frequency synthesizer coupled to receive said reference frequency from said phase-lock receiver and the synchronous transmitter range tone from the range tone oscillator to provide a pair of RF transmitter frequencies whose frequency difference is equal to the frequency of the carrier range tone.

18. The radio location and communication system of claim 15, wherein each of said stationary receiving means comprises:

a phase-lock receiver phase-locked to said broadcast carrier signal to derive therefrom said periodic carrier range tone and a first reference frequency signal, frequency synthesizer coupled to said phase-lock receiver for synthesizing said first reference signal to produce one or more second reference signals each second signal corresponding with pairs of RF signals from one or more of said locator transmission means, narrow band receiver coupled to said frequency synthesizer having parallel channels for synchronizing said second reference signals from said frequency synthesizer with incoming pairs of RF signals to produce a second range tone and an ID code, and a delta range detector and decoder coupled to receiving said narrow band receiver and said phase-lock receiver for said second range tone and ID code, timing signals, and said periodic carrier range tone, to derive ID and differential range information for each of said locator transmission means and transmitting said information to another of said receiving means.

19. The radio location and communication system of claim 1, wherein said plurality of stationary receiving means comprise two receiving means.

20. The radio location and communication system of claim 19 wherein said stationary broadcast means and said two receiving means are approximately equally spaced from one another.

21. The radio location and communication system of claim 8 wherein said plurality of stationary receiving means comprise two receiving means.

22. The radio location and communication system of claim 21 wherein said stationary broadcast means and said two receiving means are approximately equally spaced from one another.

23. The radio location and communication system of claim 15 wherein said plurality of stationary receiving means comprise two receiving means.

24. The radio location and communication system of claim 23 wherein said stationary broadcast means and said two receiving means are approximately equally spaced from one another.

* * * * *

UNITED STATES PATENT AND TRADEMARK OFFICE
CERTIFICATE OF CORRECTION

PATENT NO. : 4,651,156
DATED : March 17, 1987
INVENTOR(S) : Martinez

It is certified that error appears in the above-identified patent and that said Letters Patent is hereby corrected as shown below:

| COLUMN | LINE | DESCRIPTION |
| --- | --- | --- |
| 2 | 35 | delete "ca" and insert --can-- |
| 4 | 48 | delete "transmittin 9" and insert --transmitting-- |
| 4 | 67 | delete "presenc" and insert --presence-- |
| 11 | 60 | delete "bhe" and insert --the-- |

Signed and Sealed this

Fourteenth Day of June, 1988

Attest:

DONALD J. QUIGG

Attesting Officer

Commissioner of Patents and Trademarks